UNITED STATES PATENT OFFICE.

VICTOR LENHER, OF MADISON, WISCONSIN.

MANUFACTURE OF SELENIUM OXYCHLORID.

1,382,922. Specification of Letters Patent. Patented June 28, 1921.

No Drawing. Application filed May 15, 1920. Serial No. 381,630.

*To all whom it may concern:*

Be it known that I, VICTOR LENHER, a citizen of the United States, residing at Madison, in the county of Dane and State of Wisconsin, have invented a new and useful Improvement in the Manufacture of Selenium Oxychlorid, of which the following is a specification.

The present invention constitutes a modification of the process set forth in my application No. 381,628, filed in the United States Patent Office on even date herewith.

The primary object of the invention is to provide a process of producing selenium oxychlorid ($SeOCl_2$) on a commercial scale. The use of selenium oxychlorid in the arts is unknown. The compound possesses remarkable properties as a solvent, and may be put to many useful applications. It will serve as a solvent for many substances or compounds for which no known commercial solvent exists.

The process involves the formation of selenium oxychlorid by means of selenium dioxid and hydrochloric acid, and dehydration, or removal of the molecule of water from the compound to yield the product $SeOCl_2$. The process may be indicated by the following equation:

$$SeO_2 + 2HCl = SeOCl_2 + H_2O$$

However, the molecule of water is not separated, as might be understood from the equation given. Accordingly, it is proposed to employ a dehydrating substance, such as phosphorus pentoxid ($P_2O_5$) or calcium chlorid ($CaCl_2$) to effect the dehydration.

Where phosphorus pentoxid is employed as a dehydrating agent, the reaction may proceed in accordance with the following equations:

(*a*) $SeO_2 + 2HCl = SeO_2.2HCl$
(*b*) $SeO_2.2HCl + P_2O_5 = SeOCl_2 + 2HPO_3$

The following will serve as an example of the process:

Mix 111 parts by weight of $SeO_2$ and 142 parts by weight of $P_2O_5$; heat the mixture mildly if desired, and pass the hydrochloric acid over the same, thus obtaining the result indicated in the first half of the second equation and finally the result indicated in the last half of the second equation. The selenium oxychlorid may be vaporized and condensed and the metaphosphoric acid ($HPO_3$) will remain as a residue. 73 parts by weight of hydrochloric acid satisfies the equation, when taken in connection with the quantities of selenium dioxid and phosphorus pentoxid given above.

The use of phosphorus pentoxid as a dehydrating agent would render the process unduly expensive. Any other suitable dehydrating agent may be employed, as for instance, calcium chlorid ($CaCl_2$). Where this is employed, the calcium chlorid and water ($CaCl_2.H_2O$) remain as a residue.

The reaction should be performed in a vessel which will not be attacked by selenium oxychlorid. Porcelain, terra cotta, or glass will not be dissolved by selenium oxychlorid, and may be employed as a vessel, or as a lining for the vessel. If desired, one may employ a still provided with an eduction pipe and a suitable condenser, enabling the selenium oxychlorid to be distilled and condensed. Suitable provision should be made for removing the residue from the still. If heat be applied to facilitate the reaction, it is preferred to keep the temperature low enough to avoid vaporizing the selenium dioxid as such. The selenium oxychlorid, as formed, acts as a solvent for the selenium dioxid and facilitates the reaction. The selenium dioxid is readily distilled and condensed, and thus may be recovered in a purified condition.

One may obtain selenium dioxid in any suitable manner, as for instance, by causing a reaction between selenium tetrachlorid ($SeCl_4$) and water to form selenium dioxid and hydrochloric acid, after which the hydrochloric acid may be evaporated. This may be accomplished in accordance with the following equation:

$$SeCl_4 + 2H_2O = SeO_2 + 4HCl$$

Any other desired method may be employed, however, for obtaining the ingredient selenium dioxid. In the operation of separating the selenium oxychlorid from the residue which comprises the dehydrating agent, any impurities originally associated with the selenium dioxid will remain with the residue.

The foregoing detailed description has been given for clearness of understanding only and no unnecessary limitations should be understood therefrom.

What I regard as new, and desire to secure by Letters Patent, is—

1. The process of producing selenium oxychlorid which comprises causing a reaction between selenium dioxid and hydrochloric acid and separating the water from the resulting compound by means of a dehydrating agent.

2. The process of producing selenium oxychlorid which comprises mixing selenium dioxid and a dehydrating agent and subjecting the same to the action of hydrochloric acid gas.

3. The process of producing selenium oxychlorid which comprises mixing selenium dioxid and a dehydrating agent and subjecting the same to the action of hydrochloric acid and the action of applied heat.

4. The process of producing selenium oxychlorid which comprises heating selenium dioxid and a dehydrating agent, subjecting the same to the action of applied heat, and subjecting the heated ingredients to the action of hydrochloric acid gas.

5. The process of producing selenium oxychlorid which comprises moderately heating a mixture of selenium dioxid and a dehydrating agent, subjecting the heated mixture to the action of hydrochloric acid gas, the temperature employed being insufficient to volatilize the selenium dioxid, and after the selenium oxychlorid has been formed, distilling and condensing the same, leaving the dehydrating agent in the residue.

6. The process of producing selenium oxychlorid which comprises mixing selenium dioxid and calcium chlorid and subjecting the same to the action of hydrochloric acid gas and heat.

VICTOR LENHER.